United States Patent [19]

Petrie

[11] Patent Number: 5,572,010
[45] Date of Patent: Nov. 5, 1996

[54] DISTRIBUTED TYPE LABELING FOR EMBEDDED DATA BLOCKS

[75] Inventor: Glen W. Petrie, Los Gatos, Calif.

[73] Assignee: Xerox Corporation, Stamford, Conn.

[21] Appl. No.: 368,115

[22] Filed: Jan. 3, 1995

[51] Int. Cl.⁶ .................................................. G06K 19/06
[52] U.S. Cl. ........................................... 235/494; 235/487
[58] Field of Search ..................................... 235/487, 494

[56] References Cited

U.S. PATENT DOCUMENTS

| | | | |
|---|---|---|---|
| 4,910,725 | 3/1990 | Drexler et al. | 235/494 |
| 4,979,159 | 12/1990 | Tsuruoka et al. | 235/494 |
| 4,982,077 | 1/1991 | Kawamura | 235/494 |
| 5,113,061 | 5/1992 | Tanaka | 235/494 |
| 5,128,525 | 7/1992 | Stearns et al. | 235/494 |
| 5,304,786 | 4/1994 | Pavlidis et al. | 235/462 |
| 5,324,923 | 6/1994 | Cymbalski et al. | 235/494 |
| 5,327,510 | 7/1994 | Morikawa et al. | 235/494 |
| 5,337,361 | 8/1994 | Wang et al. | 235/462 |
| 5,416,312 | 5/1995 | Lamoure | 235/494 |
| 5,453,605 | 9/1995 | Hecht et al. | 235/494 |

Primary Examiner—Donald T. Hajec
Assistant Examiner—Mark Tremblay

[57] ABSTRACT

Recognizable codes, such as pseudo-noise ("PN") sequence address codes, are employed for type labeling embedded data patterns, such as self-clocking glyph code patterns. For example, this type labeling may be employed to identify structurally distinguished data block types.

9 Claims, 10 Drawing Sheets

| U00 | U01 | U02 | U03 | U04 | U05 | U06 | U07 | U08 | U09 | U0Z | U0B | U0C | U0D | U0E | U0F |
|---|---|---|---|---|---|---|---|---|---|---|---|---|---|---|---|
| V0F | V0E | V0D | V0C | V0B | V0Z | V09 | V08 | V07 | V06 | V05 | V04 | V03 | V02 | V01 | V00 |
| C | C | C | C | C | C | C | C | C | C | C | C | C | C | C | C |
| C | C | C | C | C | C | C | C | C | C | C | C | C | C | C | C |
| C | C | C | C | C | C | C | C | C | C | C | C | C | C | C | C |
| C | C | C | C | C | C | C | C | C | C | C | C | C | C | C | C |
| C | C | C | C | C | C | C | C | C | C | C | C | C | C | C | C |
| C | C | C | C | C | C | C | C | C | C | C | C | C | C | C | C |
| C | C | C | C | C | C | C | C | C | C | C | C | C | C | C | C |
| C | C | C | C | C | C | C | C | C | C | C | C | C | C | C | C |
| C | C | C | C | C | C | C | C | C | C | C | C | C | C | C | C |
| C | C | C | C | C | C | C | C | C | C | C | C | C | C | C | C |

| U00 | U01 | U02 | U03 | U04 | U05 | U06 | U07 | U08 | U09 | U0Z | U0B | U0C | U0D | U0E | U0F |
|---|---|---|---|---|---|---|---|---|---|---|---|---|---|---|---|
| C | C | C | C | C | C | C | C | C | C | C | C | C | C | C | C |
| C | C | C | C | C | C | C | C | C | C | C | C | C | C | C | C |
| C | C | C | C | C | C | C | C | C | C | C | C | C | C | C | C |
| C | C | C | C | C | C | C | C | C | C | C | C | C | C | C | C |
| C | C | C | C | C | C | C | C | C | C | C | C | C | C | C | C |
| C | C | C | C | C | C | C | C | C | C | C | C | C | C | C | C |
| C | C | C | C | C | C | C | C | C | C | C | C | C | C | C | C |
| C | C | C | C | C | C | C | C | C | C | C | C | C | C | C | C |
| C | C | C | C | C | C | C | C | C | C | C | C | C | C | C | C |
| V0F | V0E | V0D | V0C | V0B | V0Z | V09 | V08 | V07 | V06 | V05 | V04 | V03 | V02 | V01 | V00 |
| C | C | C | C | C | C | C | C | C | C | C | C | C | C | C | C |
| C | C | C | C | C | C | C | C | C | C | C | C | C | C | C | C |
| C | C | C | C | C | C | C | C | C | C | C | C | C | C | C | C |
| C | C | C | C | C | C | C | C | C | C | C | C | C | C | C | C |
| C | C | C | C | C | C | C | C | C | C | C | C | C | C | C | C |
| C | C | C | C | C | C | C | C | C | C | C | C | C | C | C | C |
| C | C | C | C | C | C | C | C | C | C | C | C | C | C | C | C |
| C | C | C | C | C | C | C | C | C | C | C | C | C | C | C | C |
| C | C | C | C | C | C | C | C | C | C | C | C | C | C | C | C |
| C | C | C | C | C | C | C | C | C | C | C | C | C | C | C | C |
| U00 | U01 | U02 | U03 | U04 | U05 | U06 | U07 | U08 | U09 | U0Z | U0B | U0C | U0D | U0E | U0F |

FIG. 5

|     | U00 | U01 | U02 | U03 | U04 | U05 | U06 | U07 | U08 | U09 | U10 | U11 | U12 | U13 | U14 | U15 |
|-----|-----|-----|-----|-----|-----|-----|-----|-----|-----|-----|-----|-----|-----|-----|-----|-----|
| S00 | C | C | C | C | C | C | C | C | C | C | C | C | C | C | | T14 |
| B | C | C | C | C | C | C | C | C | C | C | C | C | C | C | | B |
| S01 | C | C | C | C | C | C | C | C | C | C | C | C | C | C | | T13 |
| B | C | C | C | C | C | C | C | C | C | C | C | C | C | C | | B |
| S02 | C | C | C | C | C | C | C | C | C | C | C | C | C | C | | T12 |
| B | C | C | C | C | C | C | C | C | C | C | C | C | C | C | | B |
| S03 | C | C | C | C | C | C | C | C | C | C | C | C | C | C | | T11 |
| B | C | C | C | C | C | C | C | C | C | C | C | C | C | C | | B |
| S04 | C | C | C | C | C | C | C | C | C | C | C | C | C | C | | T10 |
| V15 | V14 | V13 | V12 | V11 | V10 | V09 | V08 | V07 | V06 | V05 | V04 | V03 | V02 | V01 | V00 |
| S05 | C | C | C | C | C | C | C | C | C | C | C | C | C | C | | T09 |
| B | C | C | C | C | C | C | C | C | C | C | C | C | C | C | | B |
| S06 | C | C | C | C | C | C | C | C | C | C | C | C | C | C | | T08 |
| B | C | C | C | C | C | C | C | C | C | C | C | C | C | C | | B |
| S07 | C | C | C | C | C | C | C | C | C | C | C | C | C | C | | T07 |
| B | C | C | C | C | C | C | C | C | C | C | C | C | C | C | | B |
| S08 | C | C | C | C | C | C | C | C | C | C | C | C | C | C | | T06 |
| B | C | C | C | C | C | C | C | C | C | C | C | C | C | C | | B |
| S09 | C | C | C | C | C | C | C | C | C | C | C | C | C | C | | T05 |
|     | U00 | U01 | U02 | U03 | U04 | U05 | U06 | U07 | U08 | U09 | U10 | U11 | U12 | U13 | U14 | U15 |
| S10 | C | C | C | C | C | C | C | C | C | C | C | C | C | C | | T04 |
| B | C | C | C | C | C | C | C | C | C | C | C | C | C | C | | B |
| S11 | C | C | C | C | C | C | C | C | C | C | C | C | C | C | | T03 |
| B | C | C | C | C | C | C | C | C | C | C | C | C | C | C | | B |
| S12 | C | C | C | C | C | C | C | C | C | C | C | C | C | C | | T02 |
| B | C | C | C | C | C | C | C | C | C | C | C | C | C | C | | B |
| S13 | C | C | C | C | C | C | C | C | C | C | C | C | C | C | | T01 |
| B | C | C | C | C | C | C | C | C | C | C | C | C | C | C | | B |
| S14 | C | C | C | C | C | C | C | C | C | C | C | C | C | C | | T00 |
| V15 | V14 | V13 | V12 | V11 | V10 | V09 | V08 | V07 | V06 | V05 | V04 | V03 | V02 | V01 | V00 |

FIG. 11

DISTRIBUTED TYPE LABELING FOR EMBEDDED DATA BLOCKS

FIELD OF THE INVENTION

This invention relates to recording formats for self-clocking glyph code and, more particularly, to recording formats that include an infrastructure of control glyphs for encoding information that facilitates the reading and/or the interpretation of these glyph codes, without detracting from their visual homogeneity.

CROSS REFERENCES

This application is related to the following concurrently filed, commonly assigned United States patent applications: an application of Glen W. Petrie on "Distributed Dimensional Labeling for Border-Type Embedded Data Blocks" Ser. No. 08/368,116, an application of Glen W. Petrie et al. on "Distributed Key Codeword Labeling of Frames of Embedded Data Blocks" Ser. No. 08/367,982, an application of Glen W. Petrie on "Distributed State Flags or Other Unordered Information of Embedded Data Blocks" Ser. No. 08/367,981, an application of Glen W. Petrie et al. on "Characterization of Embedded Data Blocks by Sync Frame Encodings of Distinctive Fixed Length Codes" Ser. No. 08/368,125, and an application of David L. Hecht et al. on "Distributed Dimensional Labeling of Embedded Data Blocks" Ser. No. 08/368,124.

BACKGROUND OF THE INVENTION

The Hecht et al. application describes recording formats for self-clocking glyph codes which spatially reference the "data glyphs" (i.e., the glyphs that encode user data) to sync glyphs (i.e., additional glyphs that spatially synchronize the glyph reading process). To this end, the data glyphs and the sync glyphs are written onto a recording medium in accordance with a predetermined spatial formatting rule, thereby recording a "glyph pattern." Furthermore, the sync glyphs are spatially distributed within this glyph pattern in accordance with a preselected spatial distribution rule, so the positioning of the sync glyphs is constrained to comply with a predefined geometric subpattern.

To provide a visually homogeneous glyph pattern, the sync glyphs are visually indistinguishable from the data glyphs. Indeed, all of the glyphs typically are defined by symbols from the same symbol set, such as slash-like symbols that are tilted from vertical at approximately +45° and −45° to encode binary "0's" and "1's", respectively.

However, in keeping with the teachings of the Hecht et al. application, the sync glyphs encode successive bits of a predetermined "sync code sequence," such that the logical ordering of the bits of the sync code sequence is preserved by the spatial ordering of the sync glyphs that encode them. Thus, to identify these sync glyphs, the decode values of glyphs that are distributed spatially in the glyph pattern in close conformity to the known sync glyph subpattern are examined. This examination is performed on successive sets of glyphs until a sufficiently large number of glyphs with decode values which substantially correlate with the known sync code sequence is found (in practice, this correlation process may tolerate a small number of correlation errors). The goal is to establish that the correlation exists over a sufficiently large number of glyphs to confirm to a suitably high probability that those particular glyphs are sync glyphs. Additional sync glyphs then are identified by extending the examination of the glyph decode values in accordance with the known sync glyph subpattern and with the rules that govern the mapping of glyph decode values into memory.

As a general rule, the sync glyph subpattern is composed of one or more linear arrays of sync glyphs. Intersecting linear arrays of sync glyphs are attractive because they can be employed for spatially synchronizing the glyph read/decode process in two dimensions (e.g., along both the x-axis and the y-axis in standard orthogonal coordinates). Often, a lattice-like sync glyph framework is favored because it not only provide adequate spatial references for spatially synchronizing the glyph read process in two dimensions, but also provides multiple paths for navigating via the sync lattice from any one sync glyph to any other, thereby enabling spatial synchronization recovery in the presence of localized damage and/or distortion to the glyph pattern.

A "glyph" is an "embedded data character", which is defined as being a two dimensional image symbology that has at least two graphical states for encoding the logical states ("1" and "0") of a single bit. An "embedded data block" (EDB) in turn, is two dimensional image symbology for the storage and retrieval of data. EDBs are composed of embedded data characters; some of which are encoded to define a synchronization frame and others of which are encoded to carry user/application-specific information. The synchronization frame (sometimes referred to as a "glyph sync subpattern") and the user information are the two major structural components of an EDB. It will be seen however, that the composition of an EDB may be extended to comprise additional components, including both implicit logical structure and explicit graphical structure for transferring information pertaining to the structural or logical composition of the EDB from the composer of the EDB to the reader/decoder. A "glyph pattern" is an instance of an EDB.

SUMMARY OF THE INVENTION

Recognizable codes, such as pseudo-noise ("PN") sequence address codes, are employed for type labeling embedded data patterns, such as self-clocking glyph code patterns. For example, this type labeling may be employed to identify structurally distinguished data block types, thereby facilitating the processing of structurally diverse data block types.

BRIEF DESCRIPTION OF THE DRAWINGS

Additional features and advantages of this invention will become apparent when the following detailed description is read in conjunction with the attached drawings, in which.

DETAILED DESCRIPTION OF THE ILLUSTRATED EMBODIMENTS

While the invention is described in some detail hereinbelow with reference to a particular embodiment, it is to be understood that there is no intent to limit it to that embodiment. On the contrary, the intent is to cover all modifications, alternatives and equivalents falling within the spirit and scope of the invention as defined by the appended claims.

I. Self-Clocking Glyph Codes

Figure 1:
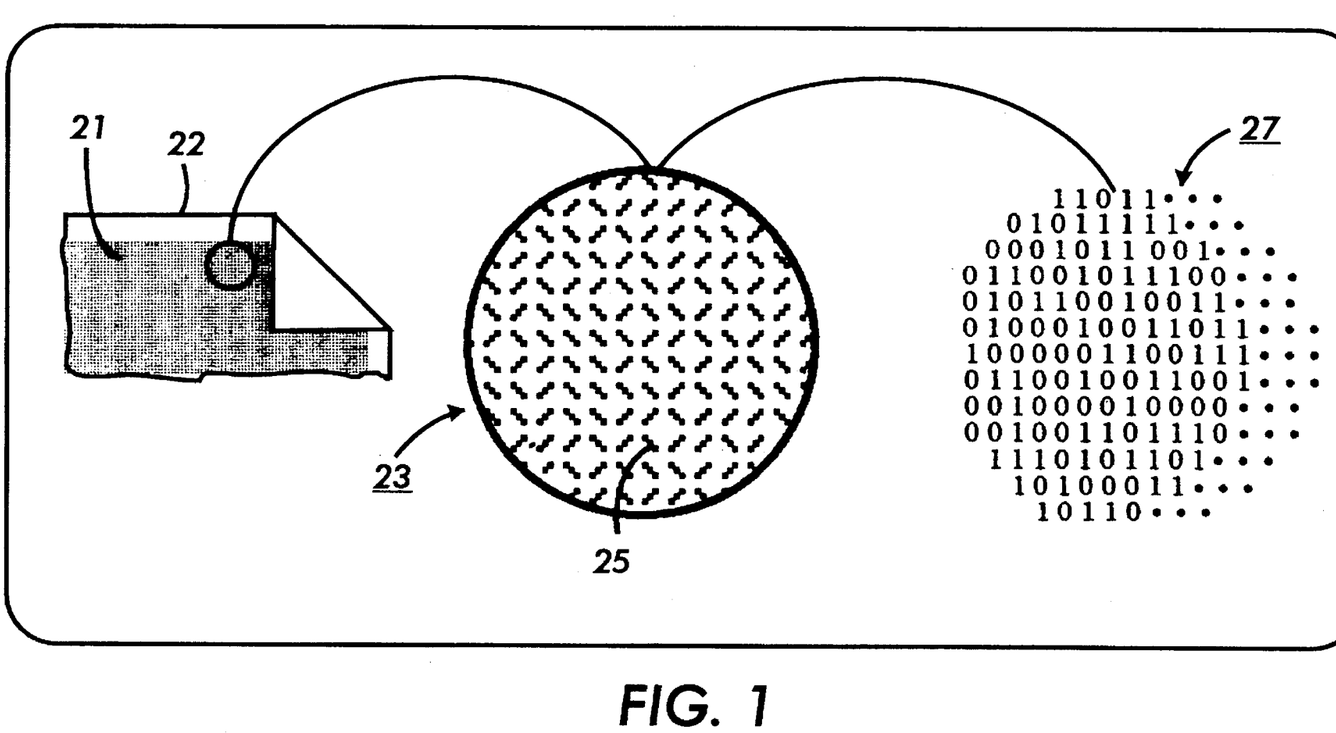
FIG. 1 illustrates an embedded data pattern which is composed, as shown by the magnified fragment and the corresponding interpretation, of a glyph code pattern for encoding machine readable binary information.

Turning now to the drawings, and at this point especially to FIG. 1, there is a rectangular self-clocking glyph code pattern 21 which is printed on a suitable recording medium 22, such as an ordinary plain paper document. For example, as most clearly shown by the magnified portion 23 of the glyph code 21, the code suitably is composed of slash-like markings or "glyphs" 25 which are tilted to the right and left with respect to the longitudinal axis of the recording medium 22 at approximately +45° and −45° to encode"0's" and "1's", respectively, as indicated at 27. Each code value is represented by the presence of a glyph, so no data is encoded in the spaces between the glyphs 25 or in the transitions that define their edges. Consequently, the glyphs 25 suitably are printed on more or less uniform centers, thereby giving the glyph code 21 a generally homogeneous visual appearance. Indeed, the scale on which the glyph code 21 is printed often is sufficiently small to cause the individual glyphs 25 to essentially blend together when viewed by the unaided eye under normal viewing conditions. This is an important advantage, especially for applications that require or benefit from being able to embed machine readable digital data in images in a visually unobtrusive or esthetically pleasing way.

II. Distributed Implicit and Explicit Labeling of Embedded Data Blocks

In practice, one or more of the dimensions of an embedded data block, such as the glyph code pattern 21, may be a variable that is altered from time-to-time, such as to provide a code pattern that is of near optimum size for the length of the machine readable message that is embedded therein or that better satisfies geometric layout requirements. However, most, if not all, of the decoding processes that might be utilized for recovering the embedded data depend on knowing the dimensions of the data block 21 with sufficient precision to determine the number of glyphs 25 that the block is expected to contain and the basic layout of those glyphs. For example, in the case of a simple rectangular data block, decoding typically requires information specifying the number of rows of glyphs in the code pattern and the number of glyphs in each row. As will be seen, the layout of the glyphs 25 might be partially specified by using fixed size code flames to construct the data block 21, but even then the dimensions of the data block 21 can be altered by increasing or decreasing the number of frames it contains and/or by spatially shifting one or more of the flames. In accordance with this invention, address codes (e.g., maximal length pseudo-noise sequence codes) are encoded by reference glyphs that are included in the code pattern 21 to provide spatial synchronization references, as well as to produce distributed labels from which the unknown dimension or dimensions of the code pattern 21 can be determined. As used herein, an "address code" is a unique sequence of values such that the position (or "relative address") in the sequence of any given value can be determined exactly by reading a specified number m, of values in the sequence, where m is a sequence dependent parameter that identifies the minimum number of values that have to be read to determine the position of a given value in the sequence. A pseudo-noise sequence (sometimes referred to as a "PNS" or a PN sequence) is an example of an address code that is suitable for most applications. A PN sequence is a sequence of binary values that would be generated by an n-element shift register that is pre-loaded with a specified seed value and operated with feedback taps at specific register locations. A "maximal length PN sequence" is unique over a length of $2^n -1$.

More particularly, it will be seen that the size (as measured in terms of a glyph count) along an unknown dimension of a data block pattern is computable from the relative addresses of a pair of spatially correlated reference glyphs, which are located within respective linear arrays of reference glyphs which span the unknown dimension of the glyph pattern in parallel alignment with each other. Indeed to simplify the computations, these reference glyph arrays advantageously, but not necessarily, are aligned parallel to the unknown dimension of the data block 21. As will be understood, it is entirely feasible to provide a data block system where the block dimensions uniquely determine all the remaining structural variables that are required for recovering the embedded data from the code pattern or data block 21.

More particularly, in keeping with one embodiment of this invention, the reference glyphs of one of the two arrays encode successive values of an address code sequence which propagates from a spatial reference at one end of the span, while the reference glyphs of the other array encode successive values of an address code sequence which propagates from a spatial reference point at the opposite end of the span. Consequently, the relative address of any given glyph within one of the arrays establishes the distance (in glyphs) to one edge of the glyph pattern, while the relative address of the spatially corresponding glyph within the second array establishes the distance (again, in glyphs) to the opposite edge of the pattern. Alternatively, as will be seen, the unknown dimension of the code pattern 21 can be computed from the relative addresses of such a pair of spatially correlated glyphs when the reference glyphs encode successive values of a single address code sequence which propagates along the unknown dimension of the glyph pattern 21 in raster-like fashion from one corner of the pattern to the diagonally opposed corner.

As will be understood, the size of the local region of the glyph pattern 21 that has to be examined need only be large enough to: (a) confirm that the reference glyphs from which the relative address information is taken are spatially correlated transversely of the unknown dimension of the code pattern, and (b) ensure reliable identification of the relative addresses of those glyphs. In general, there is no requirement for any of the glyph block boundaries for the address sequence or sequences to be within the region that is examined. Indeed, those references may be obscured by other unrelated images, or vignetted from the portion of the image that is captured for decoding, or even missing from the available instance of the glyph pattern.

This distributed dimensional labeling is extraordinarily robust in redundancy and distribution because the dimensional information is spatially distributed throughout the usual synchronization/address code which, in turn, ordinarily is spatially distributed throughout the glyph code pattern 21. As will be appreciated, distributed dimensional labeling can be very valuable, especially where portions of the glyph block are missing from the capture and/or where the glyph block is contained within in an extended pattern of additional glyphs.

Figure 2:
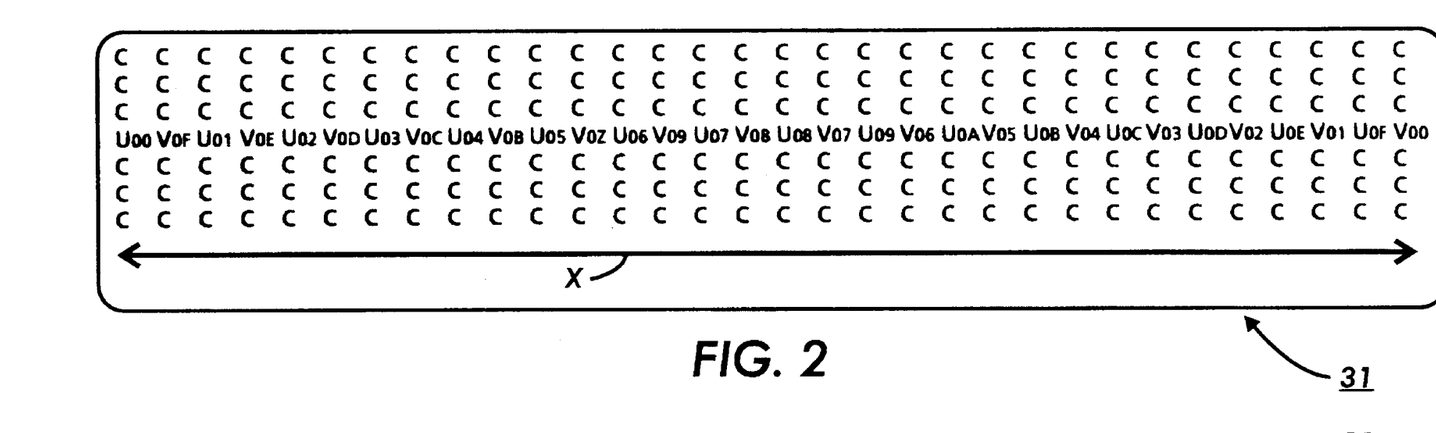
FIG. 2 illustrates a mapping of linearly interleaved counterpropagating address codes onto sync glyphs in a glyph code pattern for dimensionally characterizing the code pattern along an axis parallel to the propagation directions of the codes.

A. Distributed Dimensional Labeling Using Interleaved Counterpropagating Address Codes FIG. 2 illustrates the distributed dimensional labeling that is provided by encoding alternate, linearly arrayed glyphs in accordance with successive values of counterpropagating address codes U and V, respectively. As shown, this subpattern of reference glyphs extends across an unknown dimension of a glyph pattern 31 and is printed at the same spatial frequency (i.e., on the same center-to-center spacing) as the glyphs C that encode the user data that is embedded in the glyph pattern 31. However, the glyphs that encode the counterpropagating address codes U and V are interleaved with each other, so the sum of the relative addresses of spatially adjacent reference glyphs ( in this instance, spatial correlation is equivalent to spatial adjacency) is multiplied by a scaling factor of k=2 to determine the unknown dimension of the glyph pattern 31.

Figure 3:
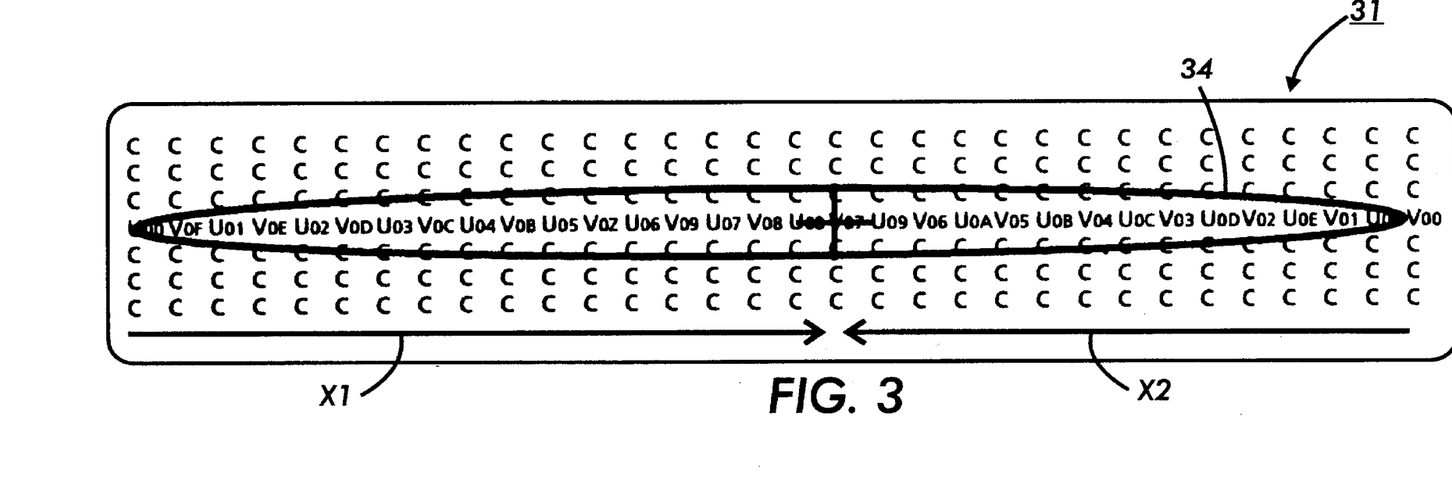
FIG. 3 illustrates the dimensional labeling that is provided in the embodiment of FIG. 2.

For example, FIG. 3 illustrates a local region 34 of the data block 31 (not including any of the boundaries of the block) from which local address and related dimensional information can be ascertained. Typically, the address codes are maximal length PN sequence that are composed of N bit long unique subsequences (i.e., such as N-stage maximal length shift register codes). As is known, for reliable decoding of such a code, a sample size of approximately 2N successive bits is a recommended. However, the decoding can be performed using a sample size as small as N successive correct bits if there is no ambiguity with respect to the code that is being employed.

More particularly, as shown in FIG. 3, unknown dimension $D_x$ of the data block 31 is determined by computing and appropriately scaling the sum of: (1) an $X_1$ distance variable to the left end of the data block 31 as determined from the address code U, and (2) an $X_2$ distance variable to the right end of the block as determined from the address code V. Advantageously, shift register codes underlying the address codes U and V are distinct if orientation ambiguity is not otherwise reliably resolved. Moreover, as discussed in further detail hereinbelow, different address codes can also be used to carry additional distributed labeling information.

Figure 4:
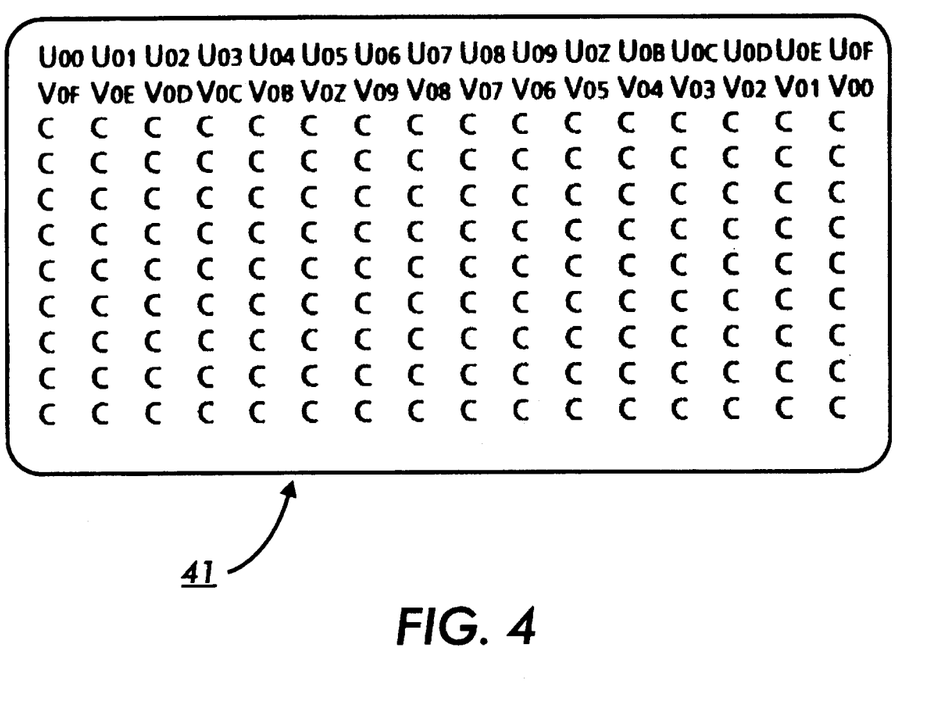
FIG. 4 illustrates a mapping of interlaced linearly counterpropagating address codes onto sync glyphs on adjacent parallel lines of a glyph code pattern for dimensionally characterizing the code pattern along an axis parallel to the propagation directions of the codes.

B. Distributed Dimensional Labeling Using Interlaced Counterpropagating Address Codes FIG. 4 illustrates the distributed dimensional labeling that is provided for a glyph pattern 41 by encoding one after another of the glyphs of two pattern spanning, parallel, spatially adjacent, linear arrays of reference glyphs in accordance with successive values of counterpropagating address codes U and V, respectively. As in the case of the above-described distributed dimensional labeling technique, these interlaced address codes dimensionally characterize the glyph pattern 41 in a direction parallel to their propagation direction Indeed, this interlaced dimensional labeling technique is functionally similar to interleaved dimensional labeling, except that the linear extent of the local region that has to be examined to recover the dimensional label is reduced and the scaling factor is k=1 (i.e., the center-to-center spacing of the reference glyphs that encode the counterpropagating address codes U and V, respectively, in the code pattern 41 is the same as the center-to-center spacing of the data glyphs C).

Figure 5:
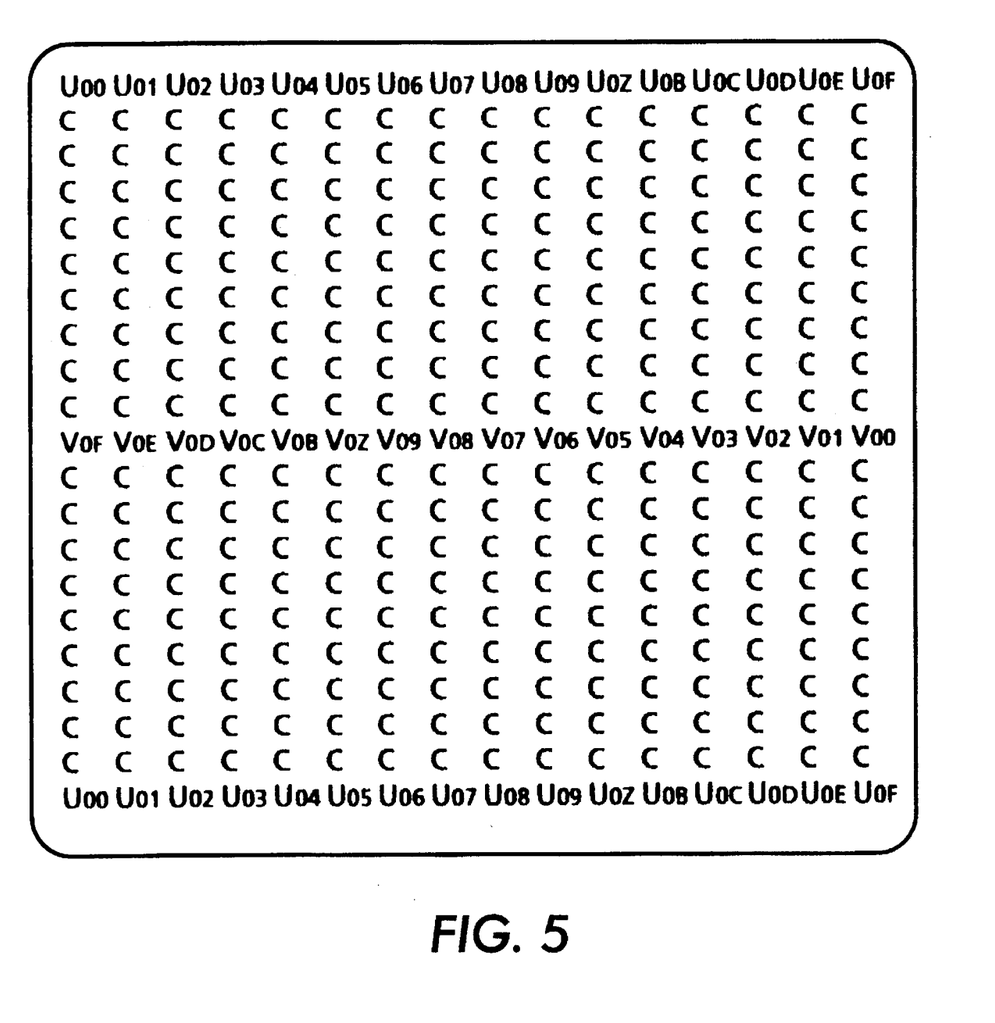
FIG. 5 is similar to FIG. 4, except that the counterpropagating address codes are mapped onto sync glyphs on adjacent non-parallel lines of the glyph code pattern.

FIG. 5 illustrates a variant of interlaced dimensional labeling. Specifically, the counterpropagating address codes parallel U and V are encoded by reference glyphs which reside within non-adjacent arrays. Otherwise, this embodiment has the same basic structure as the embodiment of FIG. 4. The lateral extent of the local area that needs to be examined to recover the distributed dimensional labeling information is increased, but the overhead allowance that is required to provide synchronization references at a sufficiently high density is reduced by a factor of almost two.

Figure 6:
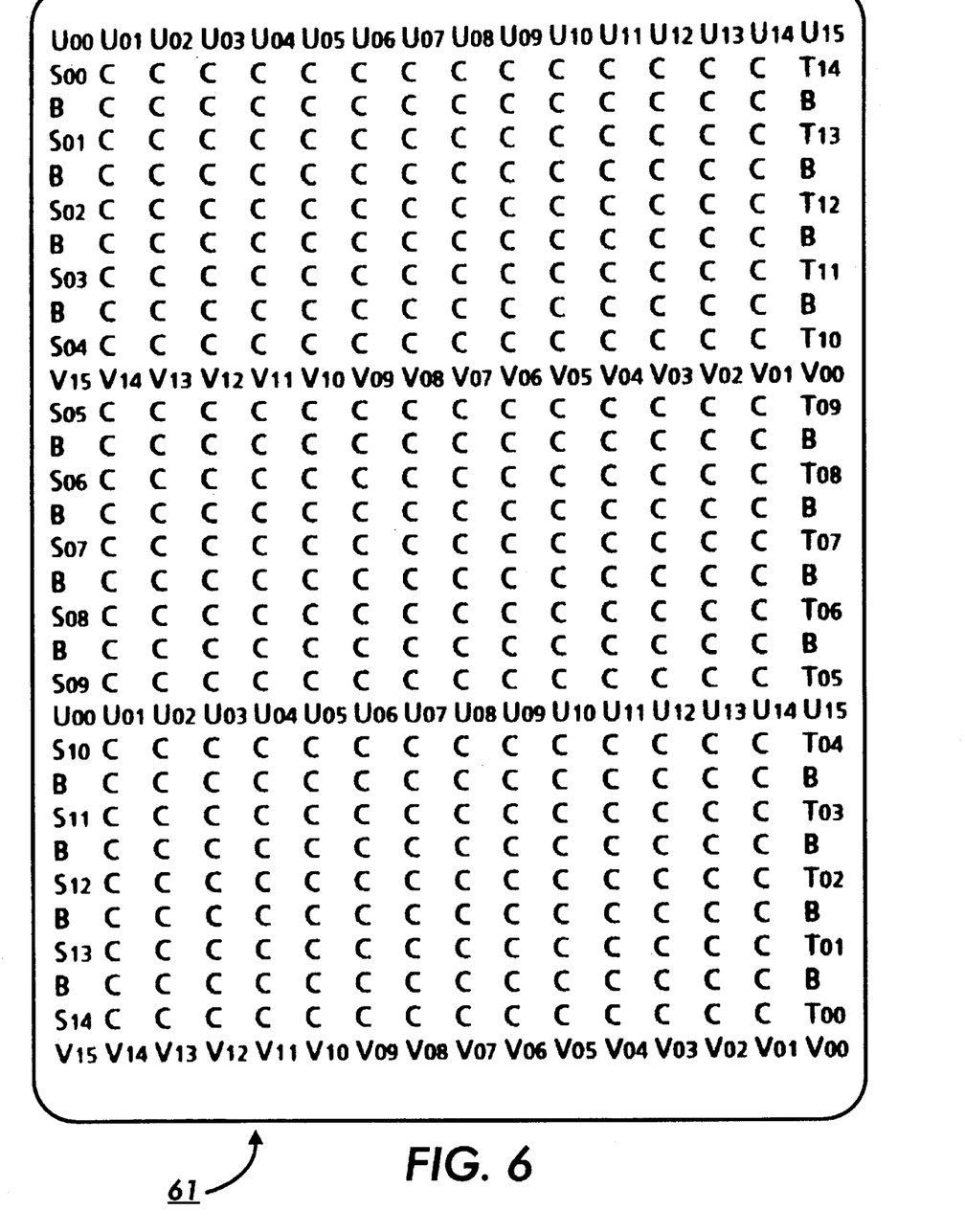
FIG. 6 illustrates a mapping of respective sets of counterpropagating address codes onto a two dimensional flamework of sync glyphs within a glyph code pattern such that the counterpropagating address codes dimensionally characterize the glyph code pattern in two dimensional space.

The interlacing of the address codes U and V requires that some additional care be taken to ensure that the relative addresses that are used for interpreting the dimensional labeling information belong to spatially correlated glyphs. Typically, a correlation process is used to identify and latch-on to the address codes, so there is no guarantee that this correlation will occur at spatially correlated locations in the two arrays. Fortunately, however, the self-clocking properties of the glyph code generally can be used to resolve this potential ambiguity. For example when the address codes U and V are maximal length PN sequences, the PN sequence U is read from the code block and correlated with the complete PN sequence U to determine the start position of the read PN sequence segment, Uss, within the complete U PN sequence U. Additionally, the spatial position, Su, of the correlated start position is recorded. Further, the above procedure is repeated for the PN sequence V within the code block resulting in the correlated position, Vss, and the corresponding spatial position Sv. Then, to produce spatially correlated glyphs for the read segments of the sequences U and V, the position value of, for example, Vss is adjusted in accordance with the difference to the two spatial positions, thereby shifting to a new start position V'ss for reading the the sequence V, where V'ss equals the original start position, Vss, plus the difference of Sv and Su. Accordingly, the sum, Svu, of the V'ss and Uss now is equal to dimension of the code block in the V - U direction. If the V and U PN sequences are laid down other than on every corresponding sequential glyph location, then the sum Svu is multiplied by the corresponding scale factor used to laydown the original glyphs C. Distributed Dimensional Labeling of Multiple Dimensions Using Nonparallel Sets of Address Codes To further build on the foregoing, FIG. 6 illustrates nonparallel, paired sets of counterpropagating address codes for distributed labeling of multiple dimensions of a glyph code block 61. To this end, the horizontally (X-direction) running, alternately counterpropagating, address codes U and V of FIG. 5, are augmented in FIG. 6 by vertically (Y-direction) running, alternately counterpropagating, non-adjacent, interlaced, parallel address codes S and T. As will be appreciated, these two non-parallel sets of address codes not only provide distributed dimensional labeling of the X and Y dimensions, respectively of the code block 61, but also permit X/Y spatial addressing of individual glyphs within the code block 61, and provide address/synchronization cross-links to each other. In practice; the glyphs that encode the address codes U and V usually run orthogonally with respect to the glyphs that encode the address codes S and T, but this is not mandatory requirement.

As shown in FIG. 6, the glyphs that encode the vertical address codes S and T are similarly interleaved at a 50% duty cycle as the glyphs that encode the intersecting members $U_{00}$, $U_{15}$, $V_{00}$ and $V_{15}$ of the horizontal address codes U and V and with some other glyphs B. This interleaving of at least one of the nonparallel sets of codes U, V and S, T, is convenient for avoiding code conflicts at intersections. Almost any regular interleave pattern that avoids potential conflicts amongst the codes can be employed. However, a pattern that permits additional information to to be encoded in certain of the interleaved glyphs, as at B, is advantageous. For example, the glyphs B may be employed for encoding data that is useful to properly decode/interpret the data block 61.

Figure 7:
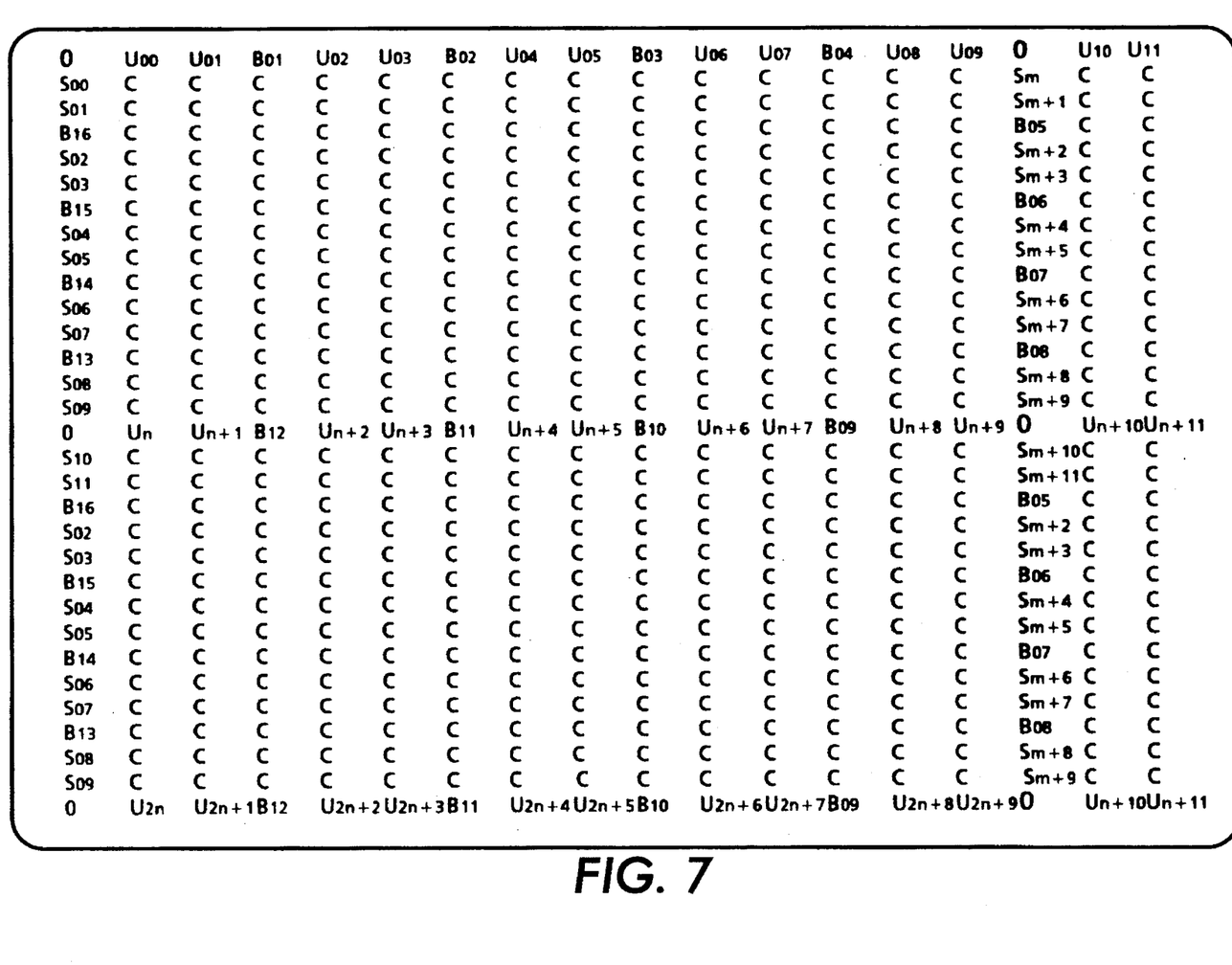
FIG. 7 illustrates folded, raster-like mappings of respective address codes onto a two dimensional flamework of sync glyphs within a glyph code pattern such that the mappings of the address codes dimensionally characterize the glyph code pattern in two dimensional space.

D. Use of Extended Folded or Rastered Extended Address Sequence For Distributed Dimensional Labeling FIG. 7 illustrates the use of extended folded or rastered extended address sequence for distributed dimensional labeling. This is an alternative to the use of counterpropagating address codes. As shown, the glyphs of the parallel sync frame lines encode respective segments of an extended length address code which may be considered folded or rastered onto the sync frame lines. Interleaving of other codes may still be employed. The data block dimension lengthwise of the sync lines is determined by the difference in the relative addresses of spatially corresponding glyphs on neighboring parallel sync frame lines (or 1/1 of that difference if the relative addresses come from spatially corresponding glyphs in sync frame lines that are separated from each other by 1 intermediate sync frame lines.

This approach to distributed dimensional labeling requires a longer unique address code sequence for data blocks that contain more than two parallel sync frame lines transversely of any given axis. This, in turn, means that the size of the area that would have to be examined to reliably capture the relative addresses of the spatially corresponding reference glyphs would be increased.

III. A Generic Embedded Data Block Implementation

Figure 8:
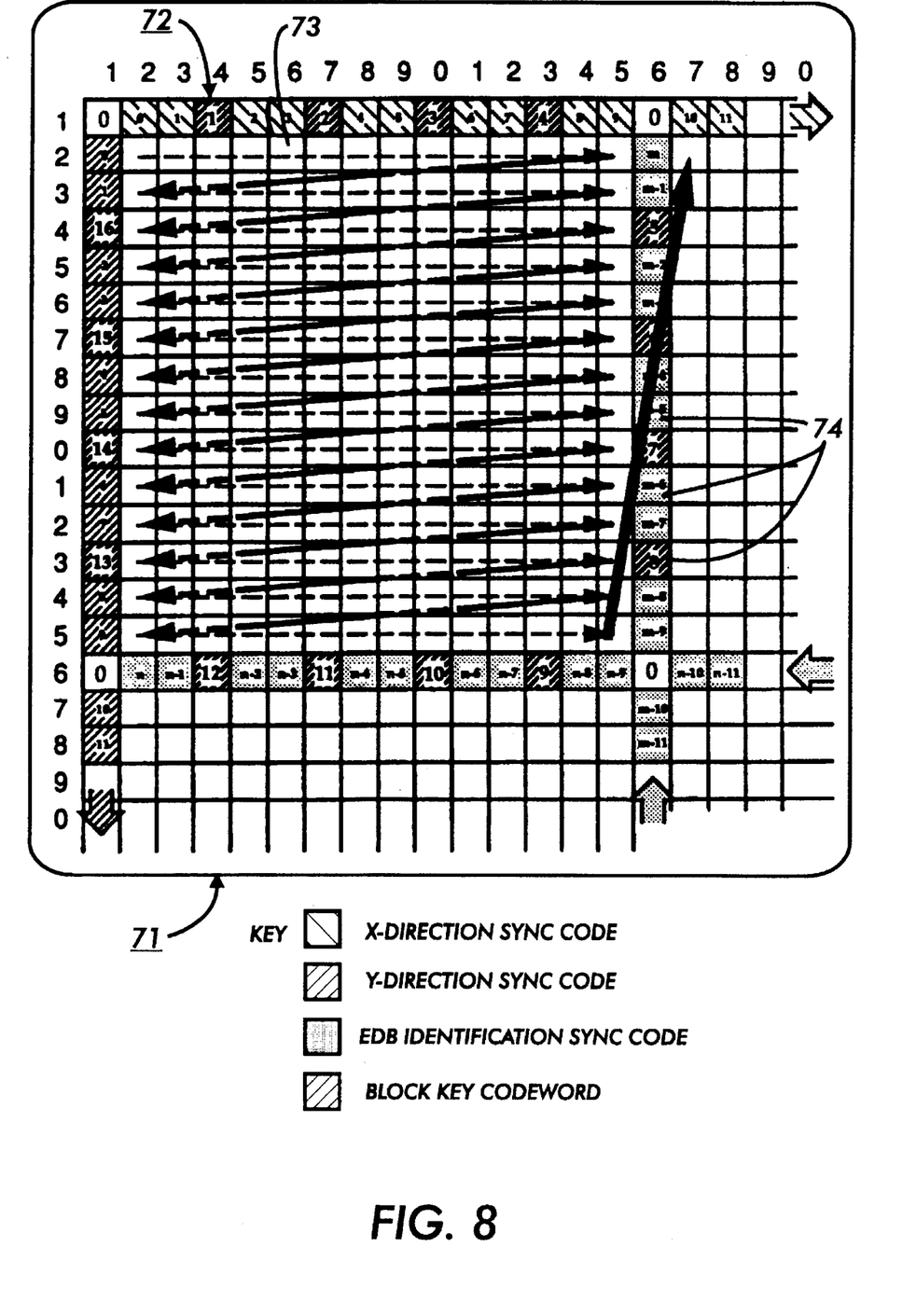
FIG. 8 is a fragmentary illustration of a simple embedded data block which is composed of multiple frame blocks of the type shown.
Figure 9:
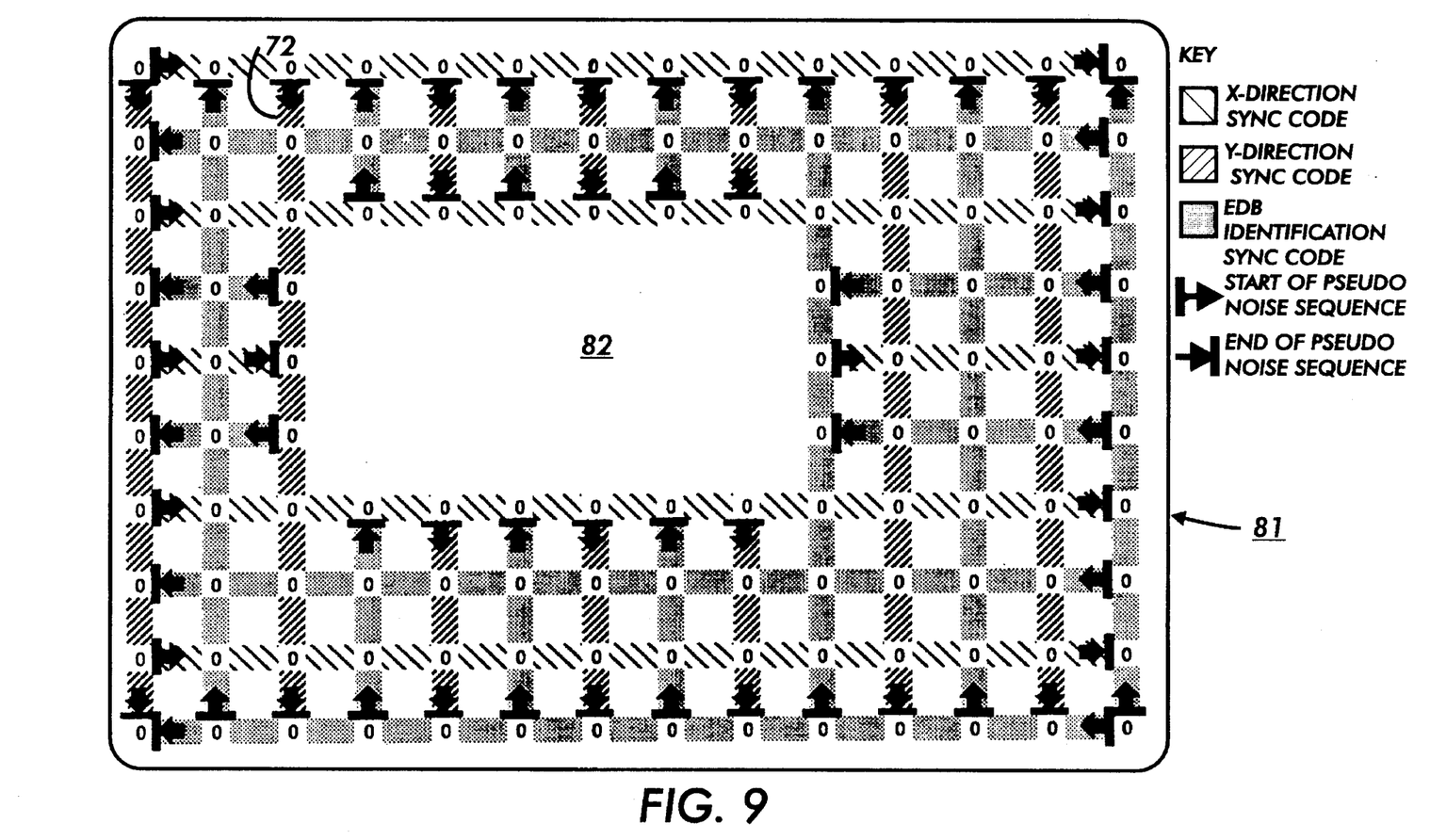
FIG. 9 is a schematic illustration of an border-type embedded data block which is composed of multiple frame blocks of the type shown in FIG. 8.

FIGS. 8–11 illustrate a generic implementation of the present invention for a plurality of different embedded data block types, such as a simple EDB 71 (FIG. 8) and a border EDB 81 (FIG. 9). As shown, the EDBs 71 and 81 are regular polygons (in this instance they are rectangular) which are composed of linked frame blocks, such as at 72 in FIG. 9 (the frame blocks 72 are described as "linked" because adjacent frame blocks have common or shared boundary glyphs, as at 74 in FIG. 8). In this particular implementation, each of the frame blocks 72 contains a 16×16 array of glyphs, which are distributed on essentially uniformly spaced centers in accordance with a regular grid pattern (the glyphs are represented by the individual cells of the grid, such as at 73). The boundary glyphs of the frame blocks 72, therefore, collectively define a regular lattice-like framework for each of the EDBs 71 and 81.

Focusing first on the common features of the lattice frames that are provided for the EDBs 71 and 81, it will be seen that the encodings for the glyphs along each reach of these lattices periodically interleave an address code with additional information that further characterizes the EDB for the reader/decoder. In the illustrated embodiment, the additional information that is explicitly encoded by the glyphs of the lattice frame includes key codewords and flags. These flags indicate whether special processing codewords will or will not be found internally of the frame blocks 72. Key codewords and special processing codewords are both described in some further detail hereinbelow. At this point, however, it should be noted that the interleave function is selected so that the flags for the special processing codewords are encoded by the glyphs at the corner intersections of the orthogonal lattice frame, thereby avoiding address code conflicts (i.e. conflicts between the address codes running along the orthogonal axis of the lattice) and key codeword conflicts (i.e. conflicts between the key codewords for diagonally neighboring frame blocks).

As will be seen, several different address codes are employed to provide distributed dimensional labeling, distributed block type labeling, and distributed rotational orientation labeling for the EDBs 71 and 81. Typically, however, these address codes all have the same basic logical structure so that they map into the lattice glyphs spatially consistently when they are encoded in those glyphs at a given duty cycle. For examples in view of the 16 glyph ×16 glyph dimensions of the frame blocks 72 for this particular implementation, each of the address codes suitably is a nine element, maximal length shift register code (i.e., a nine bit wide PNS) which is encoded in the lattice glyphs at a two third ($\frac{2}{3}$) duty cycle (i.e., two out of every three glyphs in the lattice frame encode address code). At a two third duty cycle, the nine bit long subsequences of the encoded address codes span fourteen glyphs. Furthermore, correspondingly positioned bits (e.g., the initial bits) within successive subsequences of the encoded address codes are displaced from each other by sixteen glyphs. Thus, it will be understood that the use of an interleave having a two thirds duty cycle maps successive subsequences of a nine bit wide PNS into respective frame blocks 72 of the EDBs 71 and 81, without involving any of the glyphs at any of the lattice intersections. Accordingly, these "corner" glyphs can be reserved for encoding flag bits, as previously described. Furthermore, such an interleave sets aside four additional glyphs on each side of each of the frame blocks 72 for encoding a key codeword plus an error correction codeword (ECC) for protecting the key codeword.

A. Distributed Labeling by Address Codes

Turning now to the distributed labeling of the EDBs 71 and 81 that is provided by the address codes, the glyphs along adjacent parallel reaches of the lattice flames encode counterpropagating address codes. For the specific embodiment, neither of the EDBs 71 or 81 is permitted to have more than 640 glyphs along its width (x-dimension) or its height (y-dimension). Therefore, in view of the two third duty cycle that is employed for interleaving the address codes with the key codewords and the special processing codeword bits, the use of nine bit wide PNS's for these address codes is more than sufficient to ensure that no subsequences are repeated in any of the address codes. Accordingly, the address codes provide distributed dimensional labels for the EDBs 71 and 81. These dimensional labels specify the width and height of the simple EDB 71 in glyphs as described hereinabove. The dimensional labels that are provided for the EDB 81 also are width and height specifications, but the widths and heights that these labels specify for different parts of the EDB 81 vary because of its more complex geometry. That subject is discussed in some additional detail hereinbelow. However, a scaling factor of k=3/2 is used for both the EDB 71 and the EDB 81 for scaling-up from the relative addresses that are provided by the counterpropagating address codes to the dimensions of the EDB as measured in glyphs because the same 2/3 duty cycle is employed for address code interleave in both of these EDBs.

More particularly, the address codes that are encoded by the glyphs on adjacent x-oriented reaches of the lattice frame not only (1) counterpropagate, but also (2) alternate to interlace (i) an x-sync code (i.e., an address code all EDBs employed, regardless of type, for distinguishing their x-axis from their y-axis) with (ii) an EDB identification code (i.e., a type-specific address code that distinguishes each EDB type from every other EDB type). As illustrated, the x-sync code propagates from left-to-right, with the first value of the code sequence being encoded in the left-most, unshared glyph in the reach (i.e., the left-most glyph that is not shared with a reach that extends in the y-direction). On the other hand, the EDB identification code propagates from right-to-left, with the first value of this code sequence being encoded in the right-most, unshared glyph in the reach.

Similarly, the address codes that are encoded by the glyphs on adjacent y-oriented reaches of the lattice (1) counterpropagate and also (2) alternate to interlace (i) an y-sync code (i.e., an address code all EDBs employed, for distinguishing their y-axis from their x-axis) with (ii) the type-specific EDB identification code. As illustrated, the y-sync code propagates from top-to-bottom, with the first value of the code sequence being encoded in the uppermost, unshared glyph in the reach. Thus, the EDB identification code counterpropagates from bottom-to-top, with the first value of this code sequence being encoded in the uppermost, unshared glyph in the reach.

Typically, the address codes are maximal length PNS sequences which can be composed using an n-element shift register with different seed values and different register tap locations. Here, for example, the address codes can be composed using a 9-element shift register with (a) register tap locations of [4, 9] for the x-sync code, (b) register tap locations of [3 4, 6, 9] for the y-sync code, (c) register tap locations of [1, 4, 8, 9] for the simple EDB-type identification code, and (d) register tap locations of [2, 3, 5, 9] for the border EDB-type identification code. The seed value that is employed for composing the above codes is [001010101] because it is desirable to prevent the codes from including long strings of "0's" (lower frequency artifacts tend to cause visual degradation of a glyph code pattern).

As shown in FIG. 9, the rectangular interior region 82 of the border-type EDB 81 is excluded from the dimensional specifications that are provided by the distributed dimensional labeling of the EDB 81. To this end, the propagation of address codes that run along the glyphs of lattice reaches which are interrupted by the interior region 82 are terminated at the last unshared glyph that they reach prior to the interruption (i.e., the inside edge of the EDB 81). Then, the propagation of the address code is reinitiated on the opposite side of the interior region 82, with the first value in the sequence being encoded by the first unshared glyph that this second region of the EDB 81 contains. In short, the border-type EDB 81 is effectively decomposed by the distributed dimensional labels that are applied to it into a set of four abutting simple EDBs, each of which is dimensionally characterized by distributed dimensional labels of the same type that are used for dimensionally characterizing the simple EDB 71.

For type characterizing an EDB, the EDB identification code that is embedded within the EDB is examined to correlate it with a known EDB-type identification code. Similarly, to rotationally disambiguate an EDB, the x and/or y-sync codes are identified and one or both of the EDB-type codes are examined to re-orient the reading of the EDB if and when that is required to read the code sequences in standard first-to-last order.

B. Interleaved Key Codewords

As shown in FIG. 8, in this implementation, four glyph positions are reserved on each side of each frame block 72 for encoding a key codeword plus an ECC codeword for protecting the key codeword. Other implementations might set aside a different number of glyph positions for interleaving glyphs that are encode logically ordered data values that define one or more of the common characteristics of the frame blocks 72 within an EDB 71 or 81. Further, the data that is encoded by these interleaved glyphs may or may not be sufficiently critical to justify protecting it with one or more ECC codewords that are computed solely on the data that is embedded in the interleaved glyphs.

With the foregoing in mind, it will be seen that the key code data on shared boundaries among adjacent frame blocks 72 must be reordered to maintaining consistent EDB layout.

Figure 10:
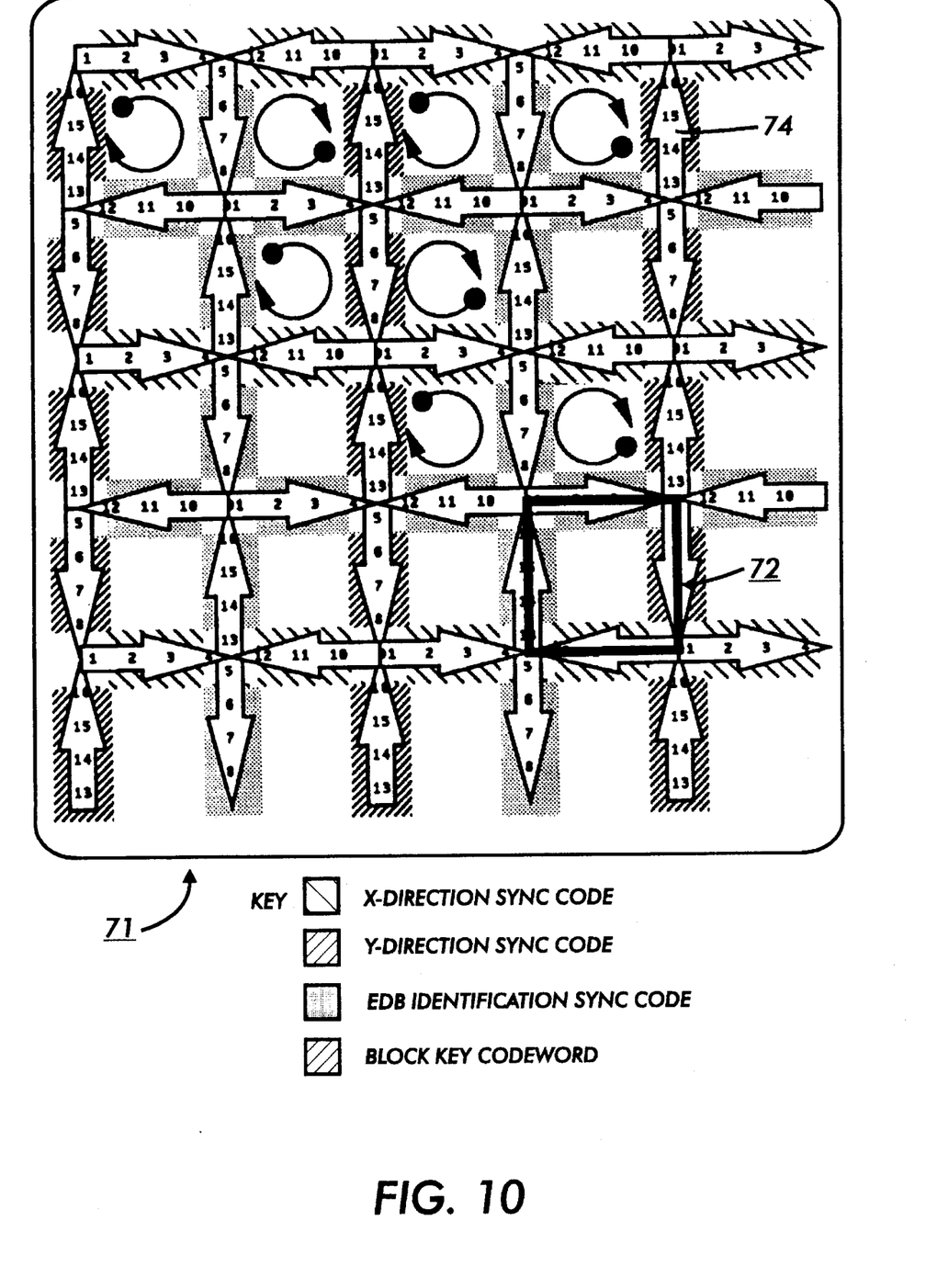
FIG. 10 is a schematic diagram that illustrates the transposed laydown and the re-ordered read for key codewords which are composed of bit sequences that are shared by the key codewords for neighboring frame blocks.

The key code work data is placed in the reserve locations in a clockwise direction start at the intersection of (i) x-direction sync line and y-direction sync line and y-direction sync line and (ii) the interaction of x EDB identification and y EDB identification lines.

The interleaving of the glyphs that encode the key codewords for the frame blocks 72 with the glyphs that encode the address codes facilitate the rapid and reliable recovery of the key codeword data from the frame blocks because the address code encoded glyphs function as pointers to the key codeword glyphs with which they are interleaved. Determination of the key codeword data read out order for a given frame block is given by the x and y positioning of the given frame block within the EDB 71 or EDB 81 relative to the upper lefthand corner of the EDB. This is a reliable indicator of the given frame blocks read out order 72.

While various types of data for characterizing the frame blocks 72 and/or the EDB 71 or 81 could be encoded by the key codeword, in the illustrated embodiment the key codeword is used to provide information for initializing an error correction process that is utilized (by means not shown) during the recovery of the data embedded in the EDB. To this end, the first seven bits of the key codeword are used to specify the error correction level that is provided by the error correction codewords (ECCs) within the EDB (i.e., the number of errors that can be corrected by those ECCs, on a scale of 0–127. For a Reed-Soloman error correction technique, this specification suitably is determined by the conservative rule that the number of errors that can be corrected is equal to one-half the number of parity bytes in the ECCs. The remaining or last bit of the key codeword, in turn, is employed to signal whether the ECCs within the EDB 71 or 81 are 128 bytes long or 256 bytes long (these are the two ECC byte sizes that are supported in this implementation).

C. Special Processing Instructions and the Interleaved Flags for Them

Figure 11:
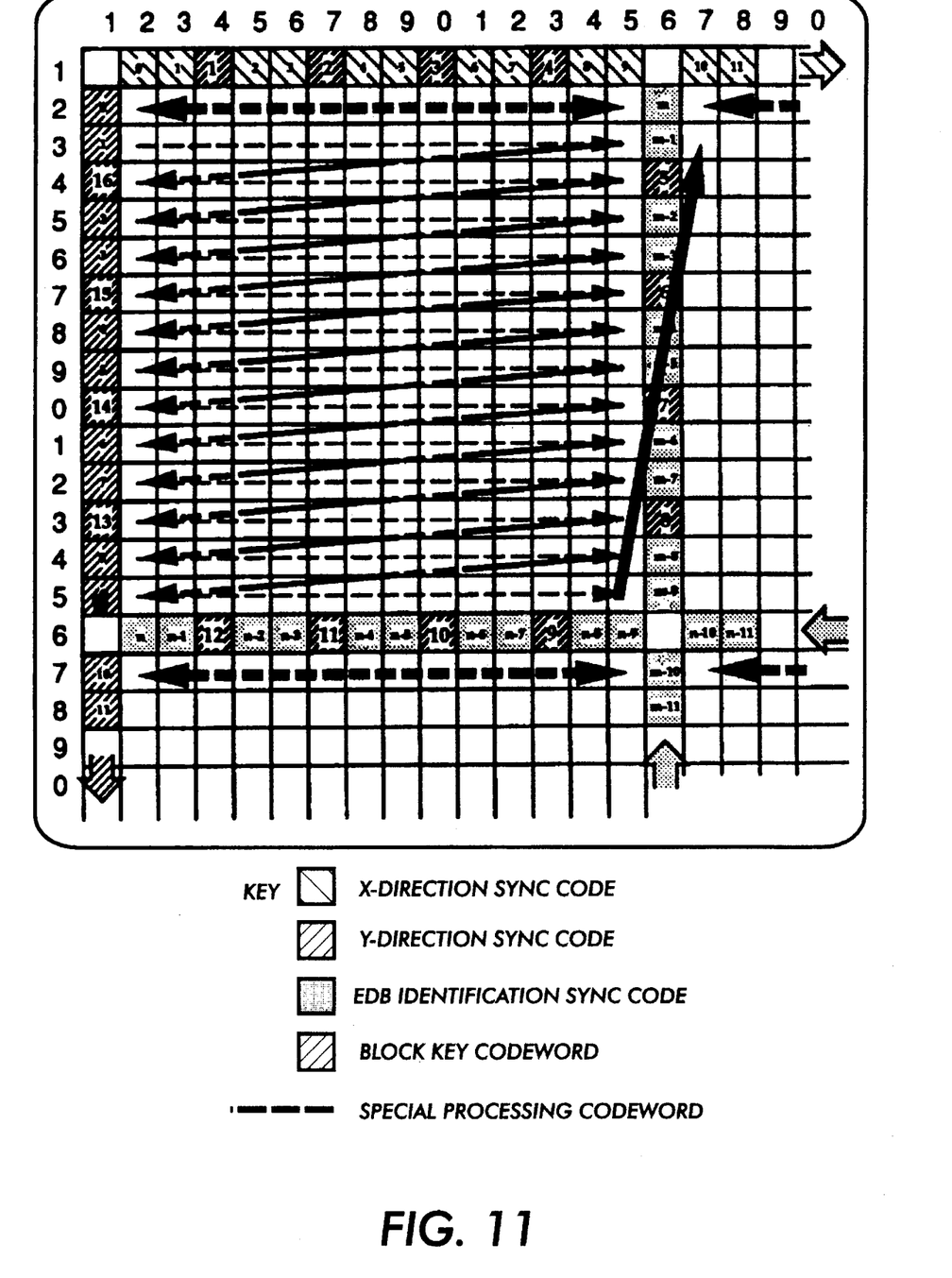
FIG. 11 is a schematic illustration of a frame block that has a flag in its sync frame set to indicate that the frame block includes an optional special processing codeword.

Turning now to FIG. 11, a predetermined number of glyphs are available in each frame block 72 for encoding information relating to application-specific and/or user selectable processing instructions. As will be appreciated, the information that these special processing instructions might provide may take many different forms because there may predefined mappings at the reader/decoder (not shown) for mapping different encodings of some or all of the glyphs for these special processing instructions onto specific operations. As shown, the uppermost row of glyphs (i.e., a total of fourteen glyphs) within each frame block 72 is available for the encoding of special instructions when required. Preferably, however, these glyphs are available for the encoding of ordinary user data when there are no special instructions. Accordingly, the corner glyphs of the frame blocks 72 encode the state of a flag that indicates whether the frame blocks 72 include special processing instructions or not.

Again, the interleaving of the glyphs that encode the state of the special processing flag with the glyphs that encode the address codes facilitates the rapid and reliable recovery of the flag state. However, the flag state is an unordered value, so it suitably is encoded by the corner glyphs of the data blocks 72 there is no risk of any ordering conflicts with the laterally or the diagonally adjacent frame blocks that share such corner glyphs. In other words, the special processing flag state is just one example of the type of unordered information that can be encoded in these corner glyphs.

What is claimed:

1. A two dimensional embedded data block for storing machine readable information on a recording medium; said embedded data block comprising a lattice-like synchronization frame composed of embedded data characters for encoding a recognizable address code, said code being selected to provide a type label for said data block and for distinguishing said data block from different data block types.

2. The embedded data block of claim 1 wherein different data block types are identified by different pseudo-noise sequences of the type that are generated by a shift register having a fixed number of stages while using different tap connections.

3. The embedded data block of claim 1 wherein said embedded data block is composed of a self-clocking glyph code pattern.

4. The embedded data block of claim 3 wherein said glyph code pattern is composed of slash-like symbols, said symbols being written on said recording medium on substantially uniformly spaced centers.

5. The embedded data block of claim 4 wherein said glyph code pattern has a substantially uniform grayscale appearance when viewed under ordinary, unaided viewing conditions.

6. A process for type labeling different two dimensional embedded data patterns, each of said embedded data patterns having a lattice-like sync frame composed of spatially distributed embedded data characters; said process comprising the steps of correlating each embedded data pattern type with a unique identification code that distinguishes it from all other embedded data pattern types, and;

encoding the identification code that is type correlated with a given embedded data pattern in the sync frame of said given data pattern, thereby applying a distributed type label to the given data pattern.

7. The embedded data pattern of claim 6 wherein said embedded data pattern is a self-clocking glyph code pattern.

8. The embedded data pattern of claim 7 wherein the embedded data characters are slash-like symbols, said symbols being written on said recording medium on substantially uniformly spaced centers.

9. The embedded data block of claim 8 wherein said glyph code pattern has a substantially uniform grayscale appearance when viewed under ordinary, unaided viewing conditions.

\* \* \* \* \*